(12) United States Patent
Bruestle

(10) Patent No.: US 10,954,020 B2
(45) Date of Patent: Mar. 23, 2021

(54) METHOD FOR ATTACHING AN ADHESIVE LABEL TO A PLASTIC OBJECT

(71) Applicant: Buckhorn, Inc., Milford, OH (US)

(72) Inventor: Matthew E. Bruestle, Cincinnati, OH (US)

(73) Assignee: BUCKHORN, INC., Milford, OH (US)

( * ) Notice: Subject to any disclaimer, the term of this patent is extended or adjusted under 35 U.S.C. 154(b) by 26 days.

(21) Appl. No.: 16/155,987

(22) Filed: Oct. 10, 2018

(65) Prior Publication Data
US 2019/0106236 A1 Apr. 11, 2019

Related U.S. Application Data

(60) Provisional application No. 62/570,404, filed on Oct. 10, 2017.

(51) Int. Cl.
| | |
|---|---|
| B65C 9/00 | (2006.01) |
| B65C 3/06 | (2006.01) |
| B65C 1/02 | (2006.01) |
| B44B 5/02 | (2006.01) |
| B29C 59/02 | (2006.01) |
| B44C 1/17 | (2006.01) |
| B29L 31/00 | (2006.01) |

(52) U.S. Cl.
CPC ............ *B65C 9/0015* (2013.01); *B29C 59/02* (2013.01); *B44B 5/028* (2013.01); *B44C 1/1729* (2013.01); *B65C 1/02* (2013.01); *B65C 3/06* (2013.01); *B29C 59/022* (2013.01); *B29L 2031/712* (2013.01); *B65C 2009/0059* (2013.01)

(58) Field of Classification Search
None
See application file for complete search history.

(56) References Cited

U.S. PATENT DOCUMENTS

| | | | | |
|---|---|---|---|---|
| 2010/0025475 A1* | 2/2010 | Webb | ................. | B41M 3/14 |
| | | | | 235/488 |
| 2010/0289179 A1* | 11/2010 | Virostek | ................. | B29C 59/02 |
| | | | | 264/241 |
| 2011/0252942 A1* | 10/2011 | Morris | ................. | G10D 3/173 |
| | | | | 84/322 |

OTHER PUBLICATIONS

Surface Preparation for 3M VHB tape applications. https://web.archive.org/web/20170615053916/https://www.3m.com/3M/en_US/bonding-and-assembly-us/resources/full-story/?storyid=b3996cbd-9954-455f-8e72-88e452ca38c0 Jun. 15, 2017 (Year: 2017).*
Superior Tape and Label, https://web.archive.org/web/20160421153355/https://www.superlabel.com/products/card-manufacturing-supplies/activation-labels Apr. 21, 2016 (Year: 2016).*

* cited by examiner

*Primary Examiner* — Barbara J Musser
(74) *Attorney, Agent, or Firm* — Benesch, Friedlander, Coplan & Aronoff LLP

(57) ABSTRACT

A method is described herein for attaching an adhesive label to a plastic object such that upon removal of the adhesive label substantially no adhesive residue is left-behind on the plastic object. In an example, the method can include applying a textured pattern to a portion of a plastic object to provide a textured surface on the plastic object. The textured pattern can be applied post molding of the plastic object. The method can include attaching to the textured surface an adhesive label.

20 Claims, 5 Drawing Sheets

METHOD FOR ATTACHING AN ADHESIVE LABEL TO A PLASTIC OBJECT

CROSS-REFERENCE TO RELATED APPLICATION

This application claims the benefit of U.S. Provisional Patent Application No. 62/570,404, filed Oct. 10, 2017, entitled "A METHOD FOR ATTACHING AN ADHESIVE LABEL TO A PLASTIC OBJECT," the contents of which are incorporated herein by reference.

TECHNICAL FIELD

The present disclosure generally relates to a method for attaching an adhesive label to a plastic object.

BACKGROUND

Plastic objects, such as containers and/or bottles can be provided in a wide variety of shapes and sizes. These objects can hold many different types of products and materials such as toys, parts, equipment, fluids, detergents, chemicals, motor oil, etc. These containers are plastic (mono or multi layers) of polyethylene, polypropylene, polyester or vinyl along with other specialty blends for specific barrier and product resistance performance. In general, plastic objects can be provided with a label. The label can include indicia, which can provide product information, trade name information, or other types of information.

SUMMARY

A method is described herein for attaching an adhesive label to a plastic object.

In an example, a method can include applying a textured pattern to a portion of a plastic object to provide a textured surface on the plastic object. The textured pattern can be applied post molding of the plastic object. The method can include attaching to the textured surface an adhesive label.

In another example, a method can include positioning a plastic object on a support of a hot-stamping machine and heating a heating head of a hot-stamping machine to a given temperature as defined by a temperature parameter to cause a die of the hot-stamping machine to be heated to the given temperature. The die can be coupled to the heating head and can include a surface with the textured pattern. The method can include applying the surface with the textured pattern to the surface of the plastic object to imprint a textured surface on the plastic object and attaching to the textured surface an adhesive label.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

Features, objects and advantages other than those set forth above will become more readily apparent when consideration is given to the detailed description below. Such detailed description makes reference to the following drawings.

BRIEF DESCRIPTION OF THE DRAWINGS

Features, objects and advantages other than those set forth above will become more readily apparent when consideration is given to the detailed description below. Such detailed description makes reference to the following drawings.

DETAILED DESCRIPTION

Figure 1:
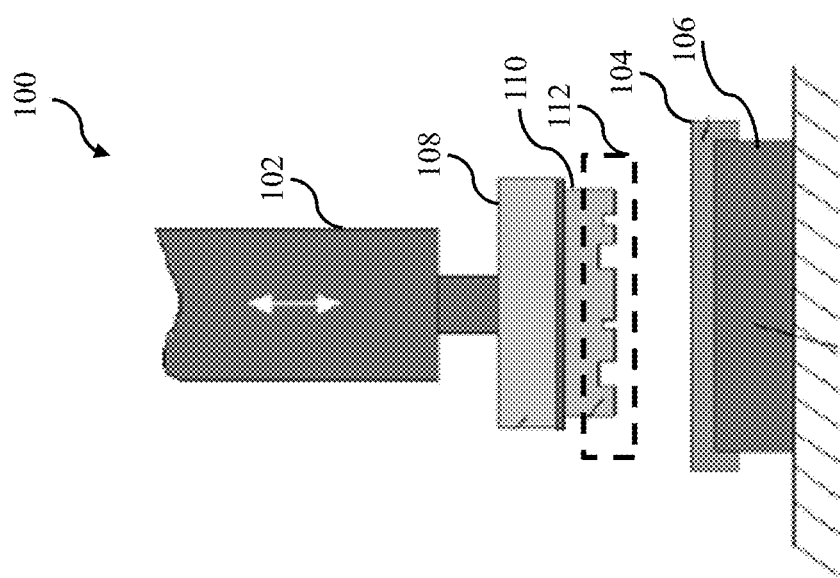
FIG. 1 illustrates an exemplary environment for providing a plastic object with a textured surface for attaching an adhesive label post molding.

Currently, techniques exist for attaching a label to a plastic object. Conventional techniques for attaching labels rely on adhesion (e.g., an adhesive, such as glue). For example, a label can be provided with an adhesive surface. The adhesive surface can be bonded with a surface of the plastic object therewith to attach the label to the plastic object. After attachment, the labeled plastic object can be provided to a recipient. A recipient of the labeled plastic object may prefer to remove the label. For example, the recipient may desire to increase an overall appearance of the plastic object. Removal of an adhesive label such that no adhesive residue is left behind can be difficult. A common method for removing labels is peeling. The adhesive label can be peeled from the surface of the plastic object. However, this approach tends to leave adhesive residue on the plastic object, which may not be aesthetically pleasing to the recipient, and, in some instances, could create an appearance, as if, the plastic object is damaged. Alternative methods for removing adhesive labels exists such that the plastic object is substantially free of the adhesive residue. Alternative methods can include soaking, steaming, and high pressure water jetting. However, these alternative methods can be substantially time consuming, unsafe, and in some instances, undesirable, and/or not feasible. Accordingly, a need exists for a method of attaching an adhesive label to a plastic object such that upon removal of the adhesive label substantially no adhesive residue resides on the plastic object.

The present disclosure relates to a method for attaching a label to a plastic object. In some examples, the plastic object can be fabricated from a plastic resin. The plastic resin can be molded by injection, compression, or blow-molding, to produce the plastic object. In an example, the label can be attached to the plastic object after the molding process. The plastic object can include, but not limited to, a plastic container, a plastic bottle, or the like. The label can correspond to an adhesive label. The adhesive label can be attached to the plastic object by adhering an adhesive face of the label to a portion of a surface of the plastic object. In some examples, the portion can include a textured surface. The textured surface can function as a peel-and-stick surface such that the adhesive label can partially adhere to the plastic object.

The textured surface can substantially reduce a total surface area of the adhesive face that can come into contact with the surface of the plastic object. By reducing the total surface area of the adhesive face that can come into contact with the surface of the plastic object, substantially reduces the likelihood that the adhesive residue from the adhesive face will reside upon removal of the label. In an example, a user can readily and easily remove the adhesive label from the plastic object such that substantially no adhesive residue is left-behind on the surface of the plastic object. The advantages of the methods described herein will be better understood and become more readily apparent according to the following examples described herein.

FIG. 1 illustrates an exemplary environment 100 for providing a plastic object with a textured surface for attaching an adhesive label post molding. The general environment can include a hot-stamping machine 102. The hot-stamping machine 102 can be used to imprint a textured pattern on a portion of a surface of a plastic object 104. The plastic object 104 can be positioned on a support 106 of the hot-stamping machine 102. The hot-stamping machine 102 can be configured such that imprinting of the textured pattern on the surface of the plastic object 104 does not substantially deform the plastic object 104. Deformations can include, but not limited to, relief stresses and strains, state changes (e.g., melting), introduction of laminar flow of the plastic object at a multi-molecular depth, or the like.

In some examples, one or more parameters of the hot-stamping machine 102 can be adjusted to provide for imprinting of the textured pattern without deforming the plastic object 104. The one or more parameters can include one of a temperature parameter, a pressure parameter, a dwell-time parameter, and a combination thereof. Each parameter can be set to a particular value such that the textured pattern can be imprinted without causing substantial deformations in the plastic object 104. In an example, each parameter can be a user-definable parameter.

Figure 2:
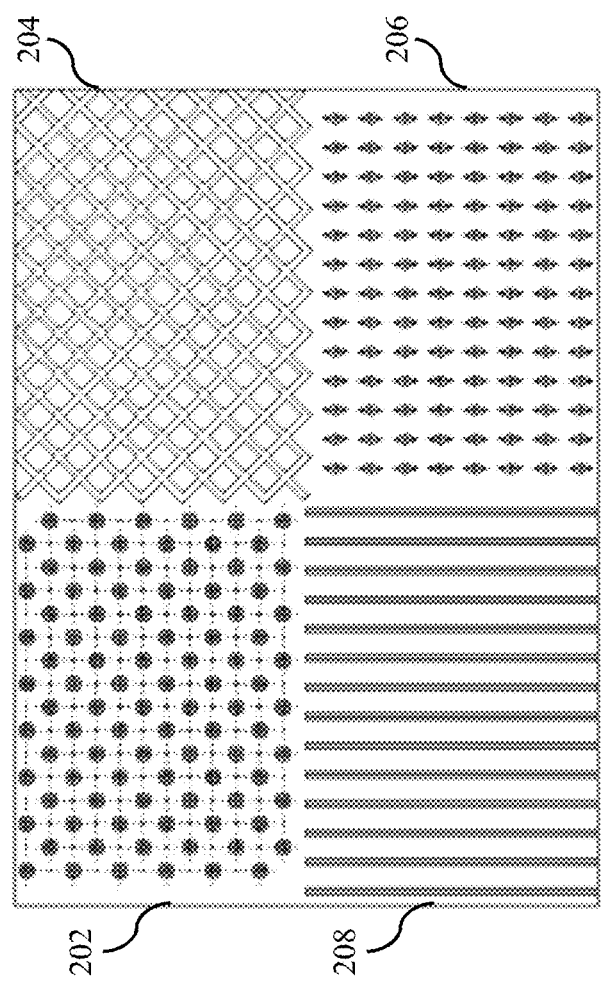
FIG. 2 illustrates exemplary textured patterns.
Figure 3:
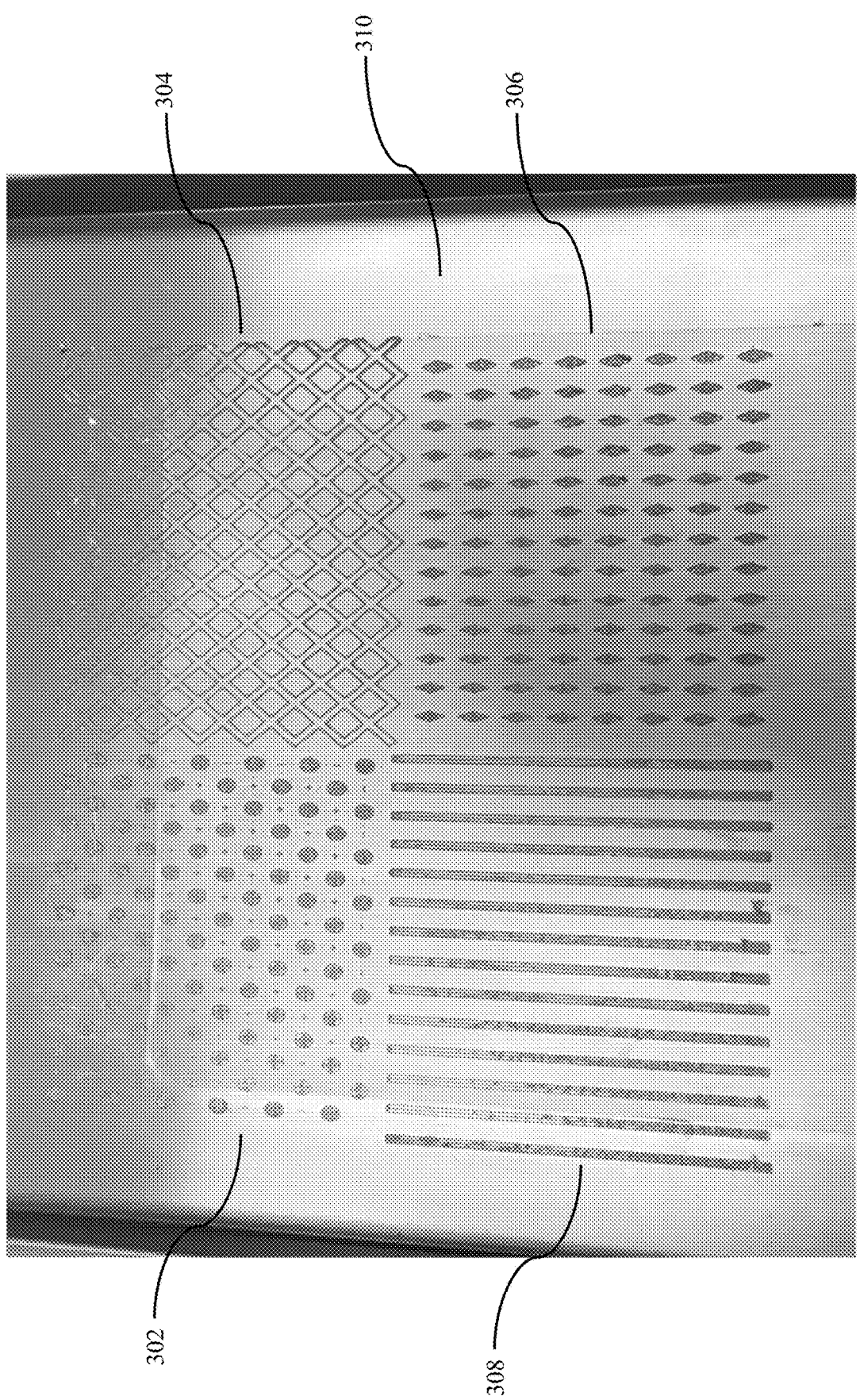
FIG. 3 illustrates exemplary textured patterns on a surface of a plastic object.
Figure 4:
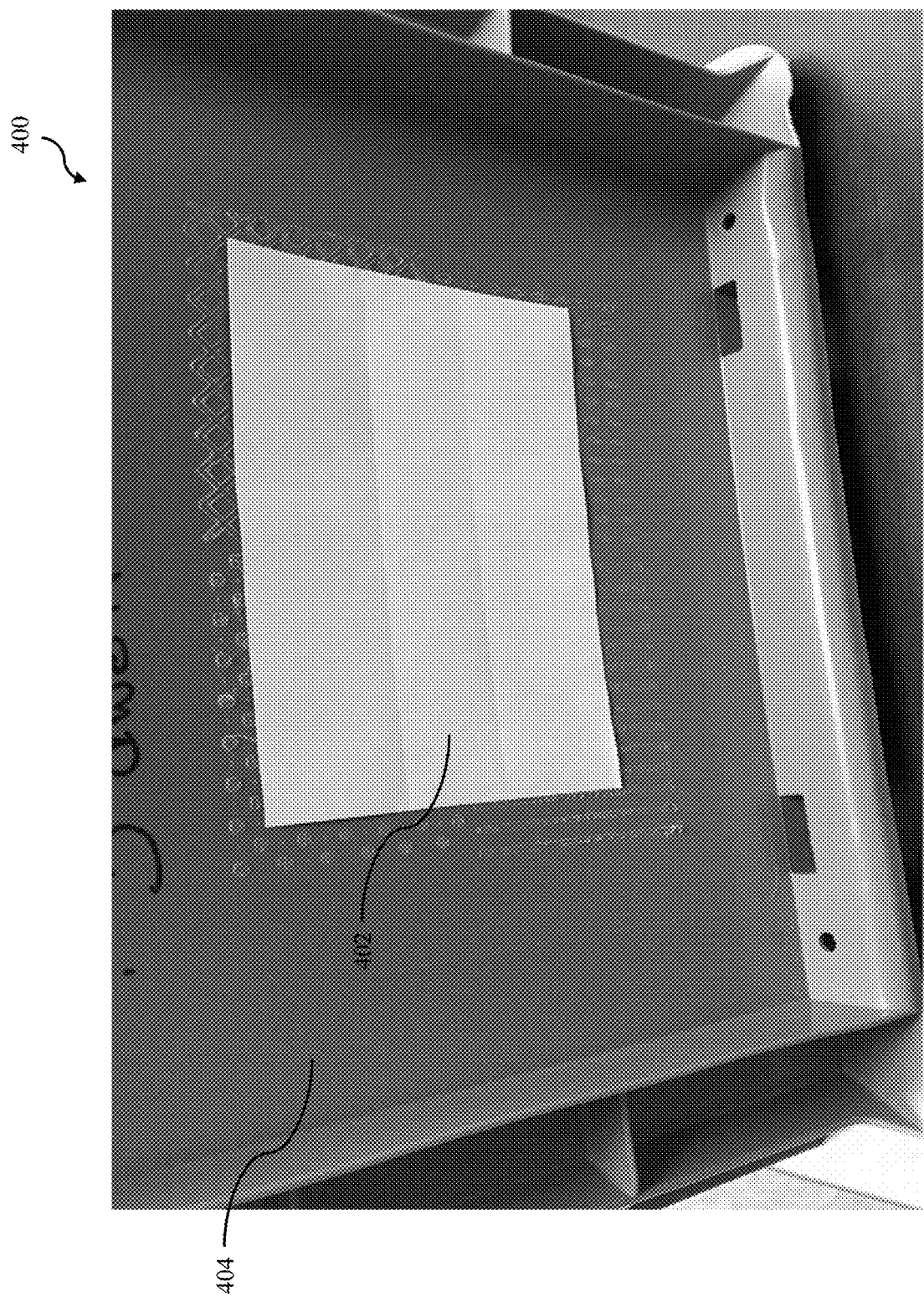
FIG. 4 illustrates an exemplary environment that includes a label adhered to a textured surface.

The hot-stamping machine 102 can include a heating head 108. In some examples, an embossing stamp 110 can be coupled to the heating head 108. The embossing stamp 110 can correspond to a die. The die can include a textured pattern 112. FIG. 2 illustrates exemplary textured patterns 202, 204, 206 and 208 (e.g., corresponding to the textured pattern 112, as illustrated in FIG. 1). A given textured pattern can be applied to the surface of the plastic object to imprint the given textured pattern on the surface of the plastic object 104, as described herein. FIG. 3 illustrates exemplary textured patterns 302, 304, 306 and 308 imprinted a surface of a plastic object 310 (e.g., the plastic object 104, as illustrated in FIG. 1). Although each of the exemplary textured patterns 302-308 can be imprinted on the surface of the plastic object 310, in some examples, only one of the exemplary textured patterns (e.g., the textured pattern 302) is imprinted on the surface of the plastic object 104. An adhesive label can be adhered to the exemplary textured patterns 200. FIG. 4 illustrates an exemplary environment 400 that includes an adhesive label 402 adhered to a textured surface 404 (e.g., corresponding to one of the textured patterns 302, 304, 306 and 308, as illustrated in FIG. 3).

In some examples, a hot stamp tape can be added upside-down between the die and the surface of the plastic object 104 to provide for a better, more consistent surface. The addition of the hot stamp tape does not leave a color and/or additional markings on the plastic surface. The hot stamp tape can include, but not limited to a film or a foil. In some examples, the heating head 108 can be heated to set the die at a particular temperature based on the temperature parameter. In an example, the temperature can be in a range of about 350 to 400 degrees Fahrenheit. The die can be applied to the surface of the plastic object 104 and exert a pressure on the surface based on the pressure parameter. In an example, the pressure can be in a range of about 40 to 60 pounds per square inch (psi). The die can be applied to the surface of the plastic object 104 and exert the pressure on the surface for a given period of time according to the dwell-time parameter such that the textured pattern can be imprinted in the surface of the plastic object 104. In an example, the dwell-time can be in a range of about 0.5 to 20 seconds. The dwell-time can define an amount of time the die is left in contact with the plastic object 104.

In some examples, the die can be removed from the surface of the plastic object 104 to provide the textured surface on the plastic object 104. An adhesive label (e.g., as illustrated in FIG. 4) can be attached to the textured surface of the plastic object 104. By reducing a total surface area of an adhesive face of the label that can come into contact with the surface of the plastic object 104, substantially reduces a likelihood that adhesive residue from the adhesive face will be left-behind upon removal of the label from the plastic object 104. Thus, a user can readily and easily remove the adhesive label from the plastic object 104 such that substantially no adhesive residue from the label is left-behind on the plastic object 104.

Figure 5:
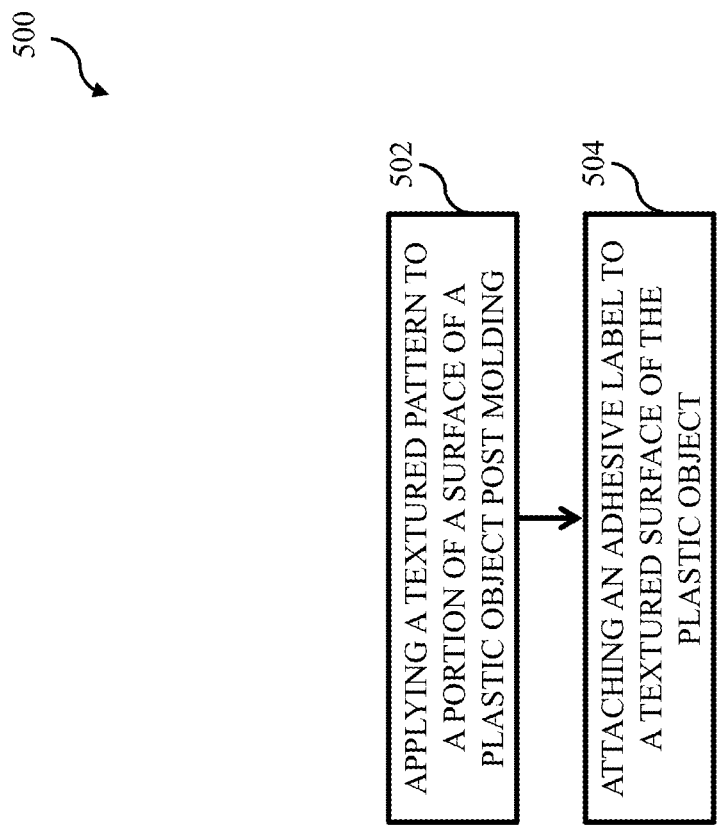
FIG. 5 illustrates an example of a flow diagram illustrating an exemplary method for attaching an adhesive label to a plastic object with a textured surface post molding.

In view of the foregoing structural and functional features described above, a method that may be implemented will be better appreciated with reference to FIG. 5. FIG. 5 illustrates an example of a flow diagram illustrating an exemplary method for attaching an adhesive label to a plastic object with a textured surface post molding. At step 502, a textured pattern can be applied to a portion of a surface of the plastic object to produce a textured surface on the plastic object. The textured pattern can be applied as a post molding process of the plastic object.

It is noted that the terms "substantially" and "about" may be used herein to represent an inherent degree of uncertainty that may be attributed to any quantitative comparison, value, measurement, or other representation. These terms are also used herein to represent a degree by which a quantitative representation may vary from a stated reference without resulting in a change in the basic function of the subject matter at issue. What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method comprising:
    applying a textured pattern to a portion of a plastic object to provide a textured surface on the plastic object, wherein the textured pattern is applied post molding of the plastic object; and
    attaching to the textured surface an adhesive label, wherein the textured surface is configured to reduce a total surface area of an adhesive face of the adhesive label when the adhesive label contacts the surface of the plastic object.

2. The method of claim 1, wherein the applying the textured pattern to the portion of the plastic object to provide the textured surface on the plastic object comprises:
   positioning the plastic object on a support of a hot-stamping machine; and
   imprinting, by the hot-stamping machine, the textured pattern on the surface of the plastic object to provide the textured surface.

3. The method of claim 2, wherein the imprinting, by the hot-stamping machine, the textured pattern on the surface of the plastic object to provide the textured surface comprises:
   heating a heating head of the hot-stamping machine to a given temperature as defined by a temperature parameter to cause a die of the hot-stamping machine to be heated to the given temperature, wherein the die is coupled to the heating head, and comprises a surface with the textured pattern; and
   applying the surface with the textured pattern to the surface of the plastic object to imprint the textured surface on the plastic object.

4. The method of claim 3, adding a hot stamp tape upside-down between the die and the surface of the plastic object.

5. The method of claim 4, wherein the hot stamp tape comprises one of a film or a foil.

6. The method of claim 3, wherein the applying the surface with the textured pattern of the die to the surface of the plastic object to imprint the textured surface on the plastic object comprises exert a given pressure as defined by a pressure parameter by the surface with the textured pattern of the die on the surface of the plastic object such that the textured pattern is sufficiently imprinted on the surface of the plastic object.

7. The method of claim 6, wherein the given pressure is exerted for a given period of time as defined by a dwell-time parameter.

8. The method of claim 7, further comprising ceasing exertion to imprint the textured surface on the plastic object.

9. The method of claim 7, wherein the given period of time is in a range of about 0.5 to 20 seconds.

10. The method of claim 7, wherein the given temperature is in a range of about 375 to 400 degrees Fahrenheit.

11. The method of claim 7, wherein the pressure parameter is in a range of about 40 to 60 pounds per square inch (psi).

12. The method of claim 1, wherein the plastic object is one of a plastic container, a plastic bottle, and a combination thereof.

13. A method comprising:
   positioning a plastic object on a support of a hot-stamping machine;
   heating a heating head of a hot-stamping machine to a given temperature as defined by a temperature parameter to cause a die of the hot-stamping machine to be heated to the given temperature, wherein the die is coupled to the heating head, and comprises a surface with a textured pattern;
   applying the surface with the textured pattern to the surface of the plastic object to imprint a textured surface on the plastic object; and
   attaching to the textured surface an adhesive label, wherein the textured surface is configured to reduce a total surface area of an adhesive face of the adhesive label when the adhesive label contacts the surface of the plastic object.

14. The method of claim 13, further comprising adding a hot stamp tape upside-down between the die and the surface of the plastic object.

15. The method of claim 13, identifying a given textured pattern from a plurality of textured patterns, wherein the given textured pattern corresponds to the textured pattern.

16. The method of claim 13, wherein the applying the surface with the textured pattern to the surface of the plastic object to imprint the textured surface on the plastic object comprises exert a given pressure as defined by a pressure parameter by the surface with the textured pattern of the die on the surface of the plastic object such that the textured pattern is sufficiently imprinted on the surface of the plastic object, wherein the given pressure is exerted for a given period of time as defined by a dwell-time parameter.

17. The method of claim 16, wherein at least two of:
   the given period of time is in a range of about 0.5 to 20 seconds;
   the given temperature is in a range of about 375 to 400 degrees Fahrenheit; and
   the pressure parameter is in a range of about 40 to 60 pounds per square inch (psi).

18. The method of claim 13, wherein one of:
   the given period of time is in a range of about 0.5 to 20 seconds;
   the given temperature is in a range of about 375 to 400 degrees Fahrenheit; and
   the pressure parameter is in a range of about 40 to 60 pounds per square inch (psi).

19. The method of claim 13, wherein the given temperature is in a range of about 375 to 400 degrees Fahrenheit, and the plastic object is one of a plastic container, a plastic bottle, and a combination thereof.

20. A method comprising:
   applying a textured pattern using a hot stamping machine to a portion of a plastic object to provide a textured surface on the plastic object, wherein the textured pattern is applied post molding of the plastic object, and wherein the plastic object is a plastic container or a plastic bottle; and
   attaching to the textured surface an adhesive label.

* * * * *